J. W. PARKER.
CLAMP.
APPLICATION FILED JULY 15, 1921.
1,428,608.
Patented Sept. 12, 1922.
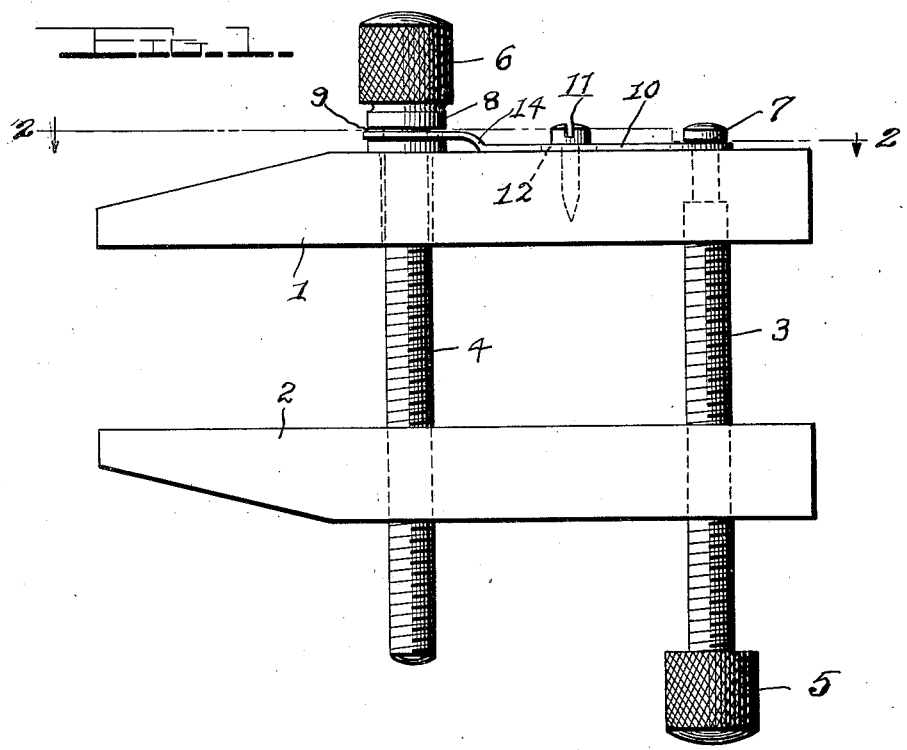
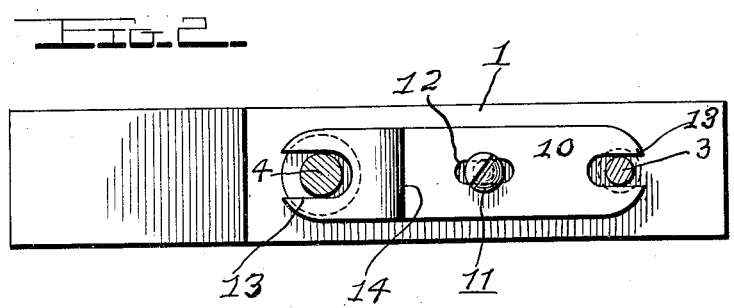
John W. Parker, INVENTOR.
BY Joseph A. Miller, ATTORNEY.

Patented Sept. 12, 1922.

1,428,608

UNITED STATES PATENT OFFICE.

JOHN WM. PARKER, OF BARRINGTON, RHODE ISLAND, ASSIGNOR TO BROWN & SHARPE MANUFACTURING COMPANY, OF PROVIDENCE, RHODE ISLAND.

CLAMP.

Application filed July 15, 1921. Serial No. 485,051.

*To all whom it may concern:*

Be it known that I, JOHN W. PARKER, a citizen of the United States, residing at Barrington, in the county of Bristol and State of Rhode Island, have invented new and useful Improvements in Clamps, of which the following is a specification.

This invention relates to certain new and useful improvements in clamps and pertains more especially to clamps of the type which have parallel jaws actuated by a pair of parallel screws.

The primary object of the invention is to provide a clamp which has novel means for swivelly connecting each screw to one of the jaws and to further provide means common to each screw for swivelly connecting each to the said jaw.

A further object of the invention is to provide means which can be easily and quickly applied in position and which avoids the boring of holes through the jaw with the consequent weakening thereof.

Still further the invention aims to provide a device for the aforestated purpose, which is simple and economical and which allows of the release of both screws from the jaw by the manipulation of a single small securing screw.

In the drawings:

Figure 1 is a side elevation of the invention, and

Figure 2 is a section on line 2—2 of Figure 1.

In proceeding in accordance with the present invention, the jaws 1 and 2 may be of metal or wood as desired and have the usual screws 3 and 4 equipped with handles 5 and 6, as is customary. The screw 3 has its free end which projects outwardly beyond the jaw 1, provided with a circular groove 7 and the screw 4 has a head 8 at the base of its handle 6, provided with a corresponding circular groove 9.

A locking plate 10 is mounted on the outer side of the jaw 1, and is interposed between the two screws as depicted in the drawings. For the purpose of rigidly attaching the plate to the jaw 1, a screw 11 is employed which extends through an elongated slot 12 at about the center of the plate and is threaded into the jaw 1, so that upon tightening of the screw the plate is clamped firmly onto and against the jaw 1.

Each end of the plate is formed with a U-shaped cutout or slot 13 engaging in the respective grooves 7 and 9, the end of the plate adjacent the groove 9 being slightly offset at 14 as shown in Figure 1. It will now be apparent that the plate affords a means for swivelly relating each screw to the jaw 1, and that by loosening of the screw 11, the plate 10 can be moved to disengage the slotted end thereof from the screw 4 and then again moved to disengage the opposite end thereof from the screw 3.

Having thus described my invention, what I claim as new and desire to secure by Letters Patent is:—

In combination with a clamp having parallel jaws and screws, a head on one screw having a circular groove, the free end of the other screw having a circular groove, a locking plate interposed between the two screws and having each end formed with a U-shaped slot engaging in the respective grooves, the end of the plate adjacent the head being offset from the adjacent jaw, and a clamping screw for securing the plate to the said jaw, said plate having an elongated slot receiving the clamping screw.

2. In combination with a clamp having parallel jaws and screws formed with circular grooves the latter disposed exteriorly of the outer face of one jaw, a unitary device on the outer face of said jaw between the screws having its ends formed to have parts thereof engage in the respective screw grooves and to be disengaged from the grooves upon bodily movement of the device, and means to secure the device against movement.

3. In combination with a clamp having parallel jaws and screws the latter provided with circular grooves each disposed beyond a side face of one of the jaws, a unitary locking plate seated upon the side face of said jaw and having its outer edges formed to be received in the respective grooves, and means to secure the plate to said jaw.

4. In combination with a clamp having parallel jaws and screws the latter provided with circular grooves each disposed beyond a side face of one of the jaws, a unitary locking plate disposed upon the side face of said jaw and having outwardly facing parts formed to be received in the respective grooves, and means to secure the plate to said jaw.

In testimony whereof I have signed my name to this specification in the presence of two subscribing witnesses.

JOHN WM. PARKER.

Witnesses:
MARION A. KINGSLEY,
J. A. MILLER.